(12) United States Patent
Meng et al.

(10) Patent No.: US 11,077,518 B2
(45) Date of Patent: Aug. 3, 2021

(54) DOUBLE-HEAD DOUBLE-SIDED HIGH-EFFICIENCY FRICTION STIR WELDING DEVICE AND WELDING METHOD THEREOF

(71) Applicant: Beijing FSW Technology Co., Ltd., Beijing (CN)

(72) Inventors: Qiang Meng, Beijing (CN); Hao Wang, Beijing (CN); Yuansong Zeng, Beijing (CN)

(73) Assignee: Beijing FSW Technology Co., Ltd., Beijing (CN)

( * ) Notice: Subject to any disclaimer, the term of this patent is extended or adjusted under 35 U.S.C. 154(b) by 192 days.

(21) Appl. No.: 16/510,837

(22) Filed: Jul. 12, 2019

(65) Prior Publication Data

US 2020/0298333 A1 Sep. 24, 2020

(30) Foreign Application Priority Data

Mar. 20, 2019 (CN) .......................... 201910212878.4

(51) Int. Cl.
*B23K 20/00* (2006.01)
*B23K 20/12* (2006.01)

(52) U.S. Cl.
CPC ................................ *B23K 20/1255* (2013.01)

(58) Field of Classification Search
CPC .............. B23K 20/1255; B23K 20/122; B23K 20/123; B23K 20/1265; B23K 20/1225; B23K 20/1235; B23K 20/1245; B23K 20/125; B23K 20/126
See application file for complete search history.

(56) References Cited

U.S. PATENT DOCUMENTS 6,302,315 B1 * 10/2001 Thompson ........... B23K 20/123
228/112.1

FOREIGN PATENT DOCUMENTS

JP    2007125598 A  *  5/2007
WO   WO-2019026864 A1 * 2/2019 ........... B23K 20/227

OTHER PUBLICATIONS

WO2019026864A1 computer english translation (Year: 2021).*
JP2007125598A computer english translation (Year: 2021).*

* cited by examiner

*Primary Examiner* — Erin B Saad
(74) *Attorney, Agent, or Firm* — Zhu Lehnoff LLP

(57) ABSTRACT

A double-head double-sided high-efficiency friction stir welding device includes a base (1), a pair of columns (2) arranged on the base (1), an upper beam (3), at least one worktable connected with a horizontal surface of the base (1), vision sensors (7) mounted on the upper head (5) and the lower head (6) and used for identifying the weld, and a CNC controller (8) used for controlling operations of the gantry, the upper head (5), the lower head (6), the worktable and the vision sensors (7).

6 Claims, 7 Drawing Sheets

DOUBLE-HEAD DOUBLE-SIDED HIGH-EFFICIENCY FRICTION STIR WELDING DEVICE AND WELDING METHOD THEREOF

This application claims the priority of Chinese Patent Application 201910212878.4 filed on Mar. 20, 2019, which application is incorporated herein by reference in its entirety.

TECHNICAL FIELD

The present disclosure belongs to the technical field of friction stir welding devices.

BACKGROUND

Since friction stir welding has been invented, the friction stir welding technology is widely concerned and deeply studied. Recently, the friction stir welding is successfully applied to rail traffic and shipping industry.

In an aluminum alloy sheet or profile friction stir welding process, a welding scheme adopts a manner of overturning a component to complete welding of the other surface after the welding of one surface of the component is completed. Such welding manner may cause the component to generate welding deformation, and the welding deformation is hard to be controlled; furthermore, some seriously deformed components need to be straightened, thereby reducing production efficiency and increasing production costs. Additionally, after the friction stir welding of a first surface is completed, two sides of a weld form flashes, they should be polished to be flat and then the welding of a second surface can be completed. Component polishing and overturning take a half of the whole complete welding time. Therefore, the friction stir welding efficiency of the aluminum alloy profile is low.

The Chinese Patent Application No. CN102481659A discloses a metal plate bonding device and bonding method, a bonding method of a metal plate in cold rolling facility, and cold rolling facility, wherein a bonding strength is increased and the reliability of the bonding strength is enhanced by minimizing fracture and poor bonding of the metal plate when the metal plate having a thickness smaller than the diameter at the shoulder portion of a rotary tool is subjected to both-side friction stir bonding, and furthermore, the lifetime of the tool is improved and the economy of the rotary tool is improved. Furthermore, welding of two surfaces of an alloy metal plate can be conducted at the same time, but only one set of component welding can be conducted, and the scale of continuous operation is not achieved, so the effect in one aspect of improving the efficiency of an overall welding technology is poor.

SUMMARY

By aiming at the above problems, the present disclosure provides the following technical solutions.

An objective of the present disclosure is to provide a double-head double-sided high-efficiency friction stir welding device, which comprises a base; a pair of columns arranged on the base; an upper beam connected with the top ends of the columns, wherein an upper head is arranged on the upper beam; a lower beam connected between the lower ends of the columns, wherein a lower head is arranged on the lower beam and corresponds to the upper head up and down, the columns, the upper beam and the lower beam form a gantry having an integrated structure, the upper head and the lower head can move by a drive device and a transmission mechanism along an X-axis, a Y-axis and a Z-axis and rotate along the Z-axis, movement of the upper head and the lower head along the X-axis and the Y-axis is driven by utilizing a linear motor or a motor-driven rack-and-pinion mechanism in a screw guide rail or rack-and-pinion guide rail transmission manner, movement of the upper head and the lower head along the Z-axis can utilize a manner such as servo electric cylinder transmission, hydraulic transmission, screw transmission, rack-and-pinion transmission and the like, rotation of the upper head and the lower head along the Z-axis can utilize a manner of combining an electric spindle or a mechanical spindle with a motor, and the motor can be a servo motor or an asynchronous motor; furthermore, the upper head and the lower head have a function of automatically adjusting a technical swing angle and can adjust a rotation angle; at least one worktable connected with a horizontal surface of the base, wherein the worktable is located between the upper head and the lower head, and the worktable and the gantry can relatively move to achieve welding; vision sensors mounted on the upper head and the lower head and used for identifying the weld; and a CNC controller used for controlling operations of the gantry, the upper head, the lower head, the worktable and the vision sensors.

Preferably, a rail groove I is formed in the inner side of the base, and the worktable can conduct horizontal reciprocating movement along the rail groove I under the drive of the linear motor or the motor-driven rack-and-pinion mechanism to form relative movement with the fixed gantry.

Preferably, a rail groove II is formed in the upper surface of the base, and the gantry can conduct horizontal reciprocating movement along the rail groove II under the drive of the linear motor or the motor-driven rack-and-pinion mechanism to form relative movement with the fixed worktable.

Preferably, the worktable comprises a fixed plate and a movable plate (clamp), which are used for loading multiple sets of components to be welded once, and locking mechanisms used for fixing; by a plurality of strip-shaped slots relatively opened in the fixed plate and the movable plate (clamp), a plurality of welds of the components to be welded are sequentially completed, and meanwhile, a plurality of components are welded in small batch; therefore, multiple clamping and unloading times are reduced, and working efficiency of the device can be greatly improved.

Preferably, anti-wear gaskets are arranged at the tail ends of the friction stir welding heads of the upper head and the lower head to reduce the wear rate when the upper and lower friction stir welding heads are in contact, an external thread is also opened in each friction stir welding head, and a wear-resistant coating is sprayed on the external thread; due to arrangement of the external thread, in the stirring process, metal is easy to flow, holes are not easy to produce, the welds are more beautiful, and additionally, the contact area of the two friction stir welding heads can be reduced; and meanwhile, the wear-resistant coating is sprayed to reduce the wear rate.

Preferably, raw materials of the anti-wear gasket and the wear-resistant coating comprise 70-80 percent by weight of tungsten carbide powder, 4-6 percent by weight of alumina fiber, 5-7 percent by weight of titanium dioxide powder, 1-3 percent by weight of vanadium oxide and the balance of graphite powder.

Preferably, a manufacturing method of the anti-wear gasket is as follows: smelting the above raw materials at the temperature of 2800-3000 degree centigrade to form liquid alloy; conducting femtosecond laser disordering irradiation, wherein the repetition frequency of a femtosecond laser is 90-100 MHz, the frequency of a chopper is adjusted to 3500-4000 Hz, femtosecond pulse number in each chipping cycle is about 18776, and the irradiation time is 5-10 min; then gradually cooling the liquid alloy to a solid state to re-smelt, repeatedly conducting the above operations for 5-8 times, then casting, and forging forming to obtain an interior-reshaped anti-wear bar; and welding the anti-wear bar and the tail end of the friction stir welding head by utilizing a cold pressure welding technology, cutting the anti-wear bar by a certain thickness to form the anti-wear gasket, and grinding and polishing to complete the manufacturing of the anti-wear gasket. The tungsten carbide has high hardness and high wear resistance, the added titanium dioxide can supplement a brittle defect of the tungsten carbide, the alumina fiber can further improve fracture toughness and bending strength, the vanadium oxide is used for filling oxygen vacancies among lattices of the tungsten carbide, reducing the concentration of oxygen ions and increasing the density of a sintered body, and the graphite powder is used for improving the lubricity of the alloy to reduce the wear rate. When the above raw materials are smelted, by utilizing the femtosecond laser disordering irradiation, metal ions are easy to generate ion lattice vibration after absorbing optical energy, and in combination with the repeated cooling and re-smelting, the lattices of the alloy are discretely rearranged. Compared with the irradiation of solid alloy, the liquid alloy has excellent fluidity during irradiation so as to be more beneficial to penetration of femtosecond laser lights and discrete rearrangement of the lattices, thereby increasing the wear resistance of the alloy. The manufacturing method of the wear-resistant coating is: after smelting the above raw material elements and conducting femtosecond laser disordering irradiation, utilizing laser re-smelting and high velocity oxygen fuel methods to crystallize on the external thread to form a coating, wherein the laser re-smelting adopts a fiber laser, its process parameters comprise defocus amount of 18-3 mm, scanning speed of 3 mm and laser power of 1000 W, and a laser beam is a constant rectangular spot of 1 mm*1 mm. Due to a great particle impact velocity, the sprayed coating and the surface of the friction stir welding head have great bonding strength and are not easy to remove during friction.

The number of worktables prefers two and can be selected according to actual situation.

A double-side high-efficiency friction stir welding method by utilizing the above device comprises the following steps:

S1: loading a component to be welded on the worktables, and driving any of the worktables to move towards the gantry under the navigation of the vision sensors while another worktable is located at an idle station;

S2: adjusting the upper head and the lower head to simultaneously align to and be gradually close to the same welding starting point along the Z-axis; ensuring that friction stir welding heads of the upper head and the lower head rotate in situ at a speed of 100-15000 r/min to enter the interior of the component to be welded till the tail ends of the upper and lower friction stir welding heads are in contact; then ensuring that the upper and lower friction stir welding heads synchronously move forwards at a welding speed of 100-7000 mm/min and simultaneously withdraw when reaching a welding tail end so as to complete ending welding of an upper surface and a lower surface of the same weld to be welded;

S3: ensuring the upper head to move along the upper beam in the Y-axis direction and the lower head to move along the lower beam in the Y-axis direction, and repeatedly conducting the step S2 till welding of all welds of the component to be welded on the same worktable is completed; and S4: moving the gantry to the worktable located at the idle station or moving the worktable located at the idle station to a welding region of the gantry, repeatedly conducting the steps S1, S2 and S3, at this time, unloading the welding-completed component, and reloading a component to be welded.

Preferably, in the S2 of ensuring that friction stir welding heads of the upper head and the lower head rotate in situ at a speed of 100-15000 r/min to enter the interior of the component to be welded till the tail ends of the upper and lower friction stir welding heads are in contact, the upper head feeds an amount equal to the diameter of one friction stir welding head along the X-axis in order that the upper and lower friction stir welding heads are interleaved mutually, and the upper head and the lower head simultaneously feed an amount equal to the 8-20% diameter of the component along the Z-axis in order that the upper and lower friction stir welding heads are interleaved mutually and working regions are partially overlapped; and then the upper and lower friction stir welding heads synchronously move forwards at a rotational speed of 100-15000 r/min and a welding speed of 100-7000 mm/min and sequentially withdraw when reaching a welding tail end so as to complete the ending welding of the upper surface and the lower surface of the same weld to be welded.

Preferably, the present disclosure further can mount at least one manipulator to assist the loading and unloading of the components to be welded.

Beneficial effects of the present discloses are:

(1), the upper head and the lower head are utilized to synchronously conduct friction stir welding on the upper surface and the lower surface of the component to be welded so as to save the time of grinding and overturning time of the component and improve the efficiency of the overall welding technology;

(2), a multi-station layout is utilized, that is, multiple worktables alternatively work, so component loading and unloading times can be saved, continuous operation is achieved, and the welding efficiency is further improved;

(3), the worktable can load multiple sets of the components to be welded once, a plurality of welds are sequentially completed, and meanwhile, a plurality of components are welded in small batch; therefore, multiple clamping and unloading times are reduced, and the working efficiency of the device can be greatly improved; and (4), anti-wear gaskets and external threads are additionally arranged on the multiple friction stir welding heads, and a wear-resistant coating is sprayed on the external thread; the anti-wear gasket can reduce the wear rate when the upper and lower friction stir welding heads are in contact; due to arrangement of the external threads, in the stirring process, metal is easy to flow, holes are not easy to produce, the welds are more beautiful, and additionally, the contact area of the two friction stir welding heads can be reduced; meanwhile, the wear-resistant coating is sprayed to reduce the wear rate.

Figure 1:
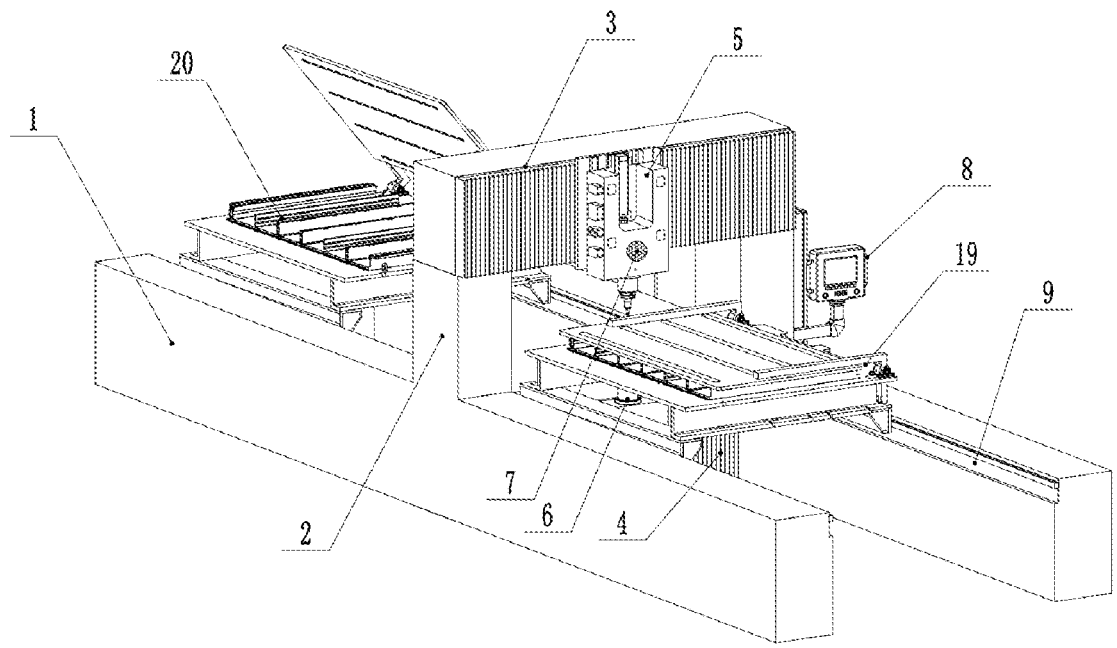
FIG. 1 is a schematic diagram of a stereo structure of a device in Embodiment 1 of the present disclosure.

In the drawings: 1—base, 2—column, 3—upper beam, 4—lower beam, 5—upper head, 6—lower head, 7—vision sensor, 8—CNC controller, 9—rail groove I, 10—rail groove II, 11—component to be welded, 12—fixed plate, 13—movable plate, 14—locking mechanism, 15—strip-shaped slot, 16—friction stir welding head, 17—anti-wear gasket, 18—external thread, 19—first worktable, 20—second worktable, and 21—third worktable.

DESCRIPTION OF THE EMBODIMENTS

Figure 3:
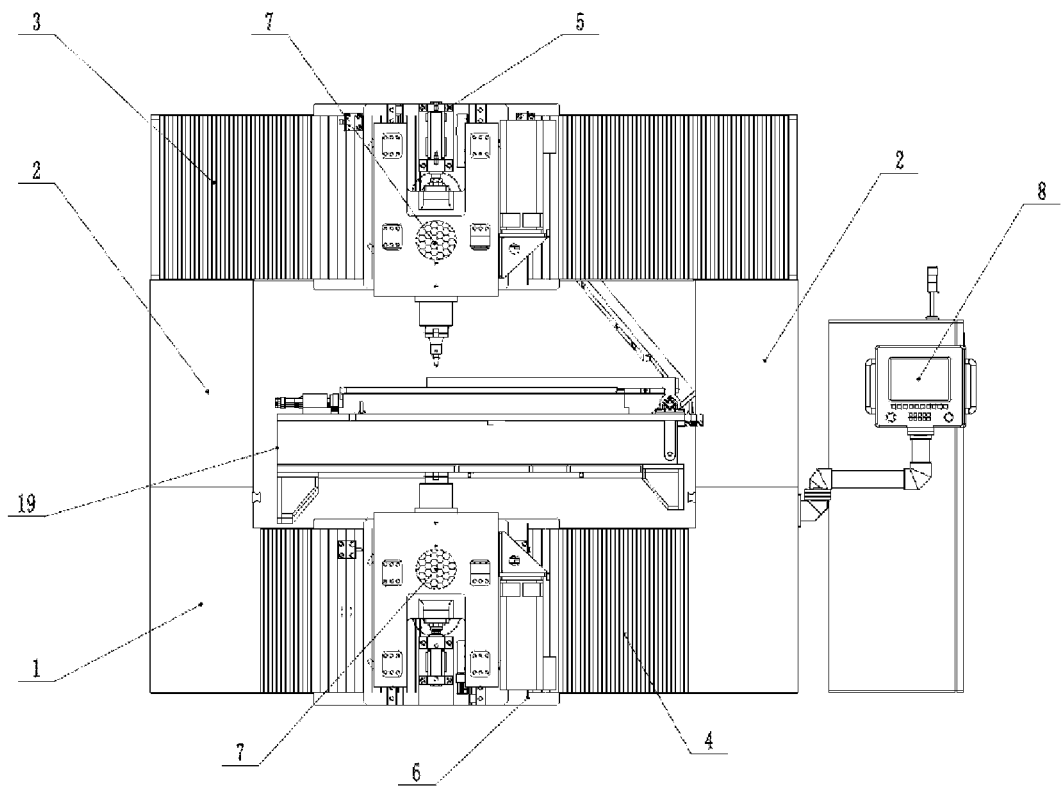
FIG. 3 is a right view of a device in Embodiment 1 and Embodiment 2 of the present disclosure.
Figure 4:
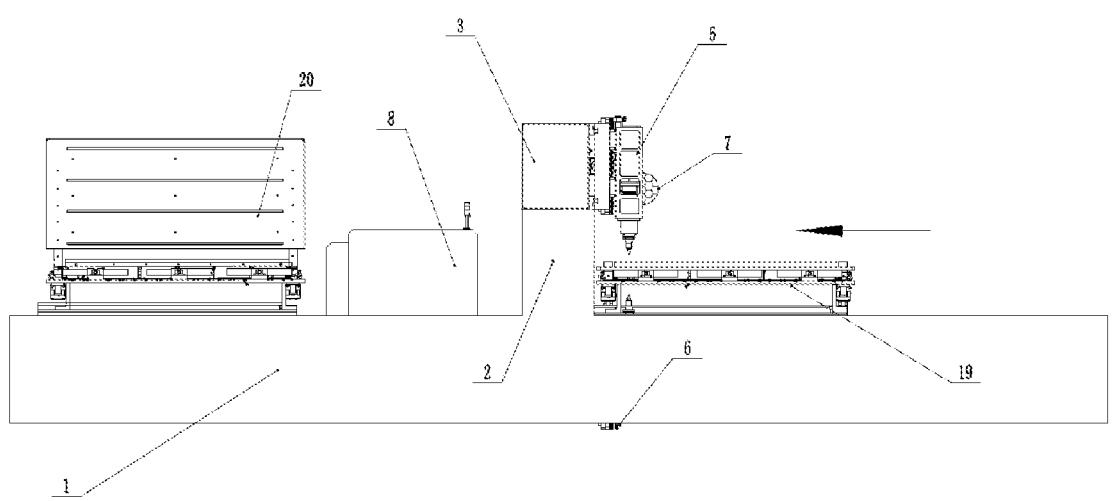
FIG. 4 is a front view of a device in Embodiment 1 of the present disclosure.

Embodiment 1: as shown in FIG. 1, FIG. 3 and FIG. 4, a friction stir welding device of the embodiment comprises: a base 1, a pair of columns 2 arranged on the base 1, an upper beam 3 connected with the top ends of the columns, an upper head 5 arranged on the upper beam 3, a lower beam 4 connected between the lower ends of the columns 2, and a lower head 6 arranged on the lower beam 4 and corresponding to the upper head 5 up and down.

Wherein the columns 2, the upper beam 3 and the lower beam 4 form a gantry having an integrated structure, the upper head 5 and the lower head 6 can move by a drive device and a transmission mechanism along an X-axis, a Y-axis and a Z-axis and rotate along the Z-axis, movement of the upper head 5 and the lower head 6 along the X-axis and the Y-axis is driven by utilizing a linear motor in a screw guide rail or rack-and-pinion guide rail transmission manner, movement of the upper head 5 and the lower head 6 along the Z-axis can utilize a manner of servo electric cylinder transmission, hydraulic transmission, screw transmission, rack-and-pinion transmission and the like, rotation of the upper head 5 and the lower head 6 along the Z-axis can utilize a manner of combining an electric spindle or a mechanical spindle with a motor, and the motor can be a servo motor or an asynchronous motor. Furthermore, the upper head 5 and the lower head 6 have a function of automatically adjusting a technological swing angle, and can adjust a rotation angle.

As shown in FIG. 1, a first worktable 19 and a second worktable 20 connected with a horizontal surface of the base 1 are provided, a rail groove I 9 is formed in the inner side of the base 1, and the first worktable 19 or the second worktable 20 can conduct horizontal reciprocating movement under the drive of the linear motor to form relative movement with the fixed gantry so as to be close to or be away from a welding region defined by the upper head 5 and the lower head 6 and vision sensors 7 mounted on the upper head 5 and the lower head 6 and used for navigating and identifying welds, and a PCL controller 8 used for controlling operations of the upper head 5, the lower head 6, the first worktable 19/the second worktable 20, and the vision sensors 7 are also provided.

Figure 8:
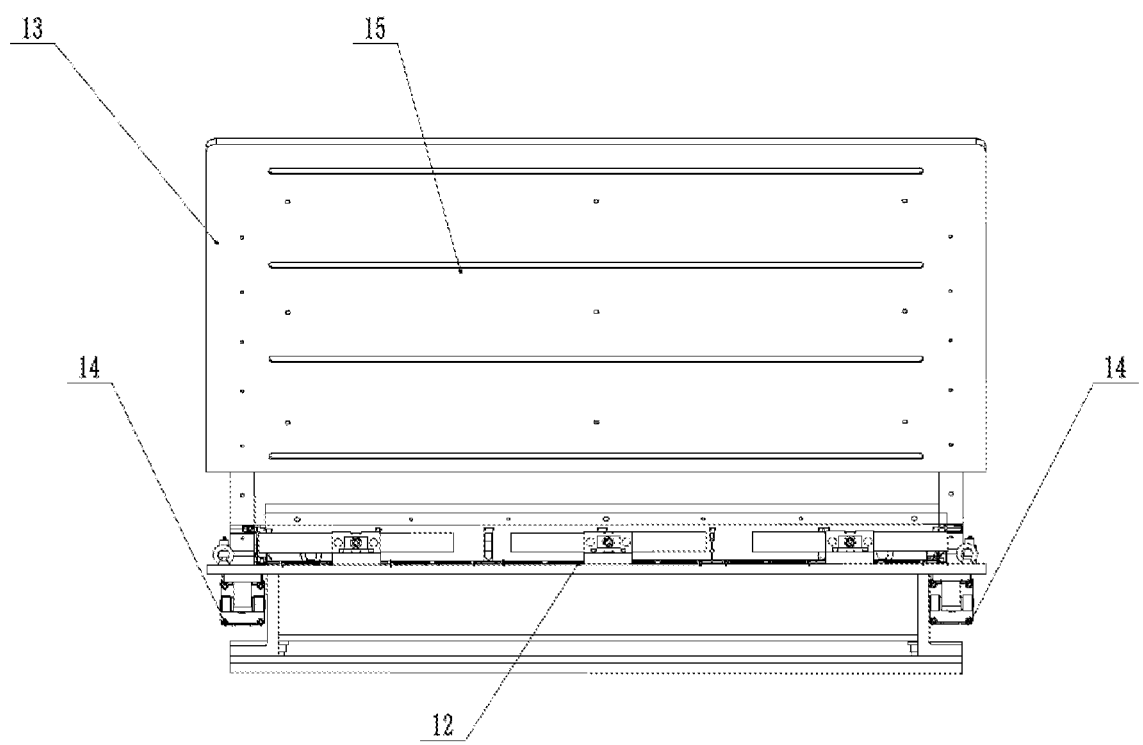
FIG. 8 is a schematic structural diagram of a worktable according to the present disclosure.
Figure 9:
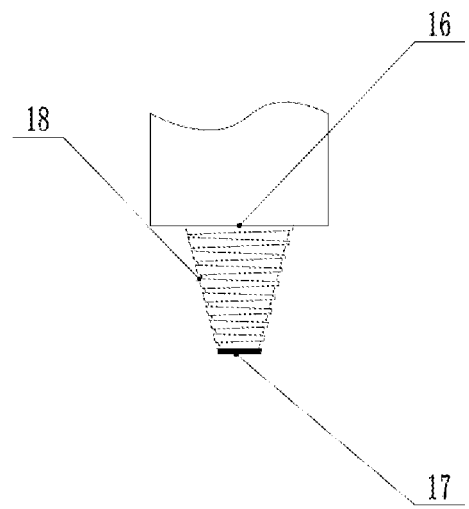
FIG. 9 is a schematic structural diagram of a friction stir welding head according to the present disclosure.

As shown in FIG. 8, the first worktable 19 and the second worktable 20 comprise fixed plates 12 and movable plates 13, which are used for loading 1-3 sets of components to be welded 11 once, and locking mechanisms 14 used for fixing; by a plurality of strip-shaped slots 15 relatively opened in the fixed plate 12 and the movable plate 13, a plurality of welds of the components to be welded 11 are sequentially completed, and meanwhile, a plurality of components are welded in small batch; therefore, multiple clamping and unloading times are reduced, and working efficiency of the device can be greatly improved.

By utilizing the device of the embodiment, a method for welding an aluminium alloy sheet with the thickness of 30 mm comprises the following steps:

S1: loading a component to be welded on the first worktable 19 and the second worktable 20, and starting a motor to drive the first worktable 19 to move towards the gantry under the navigation of the vision sensors 7 while the second worktable 20 is located at an idle station;

S2: adjusting the upper head 5 and the lower head 6 to simultaneously align to and be gradually close to the same welding starting point of a left end weld on the first worktable 19; ensuring that friction stir welding heads 16 of the upper head 5 and the lower head 6 rotate in situ at a speed of 100 r/min to enter the interior of the component to be welded till the tail ends of the upper and lower friction stir welding heads 16 reach a depth equal to 40% thickness of the component to be welded 11, wherein the tail ends of the upper and lower friction stir welding heads 16 are not contacted to prevent wear; then ensuring that the upper and lower friction stir welding heads 16 synchronously move forwards at a welding speed of 100 mm/min and simultaneously withdraw when reaching a welding tail end so as to complete ending welding of an upper surface and a lower surface of the same weld to be welded;

S3: ensuring the upper head 5 to move along the upper beam 3 in the Y-axis direction and the lower head 6 to move along the lower beam 4 in the Y-axis direction, and repeatedly conducting the step S2 till welding of all welds of the component to be welded on the first worktable 19 is completed; and S4: moving the second worktable 20 at the idle station to a welding region of the gantry, repeatedly conducting the steps S1, S2 and S3, at this time, unloading the welding-completed component with the cooperation of a manipulator, and reloading a component to be welded.

Figure 2:
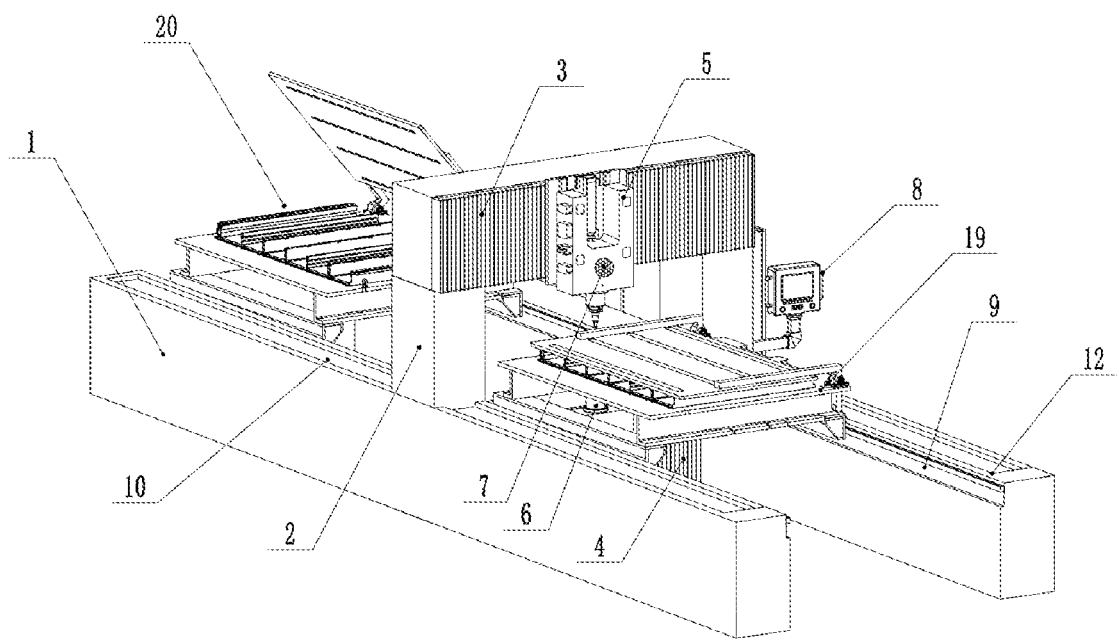
FIG. 2 is a schematic diagram of a stereo structure of a device in Embodiment 2 of the present disclosure.
Figure 5:
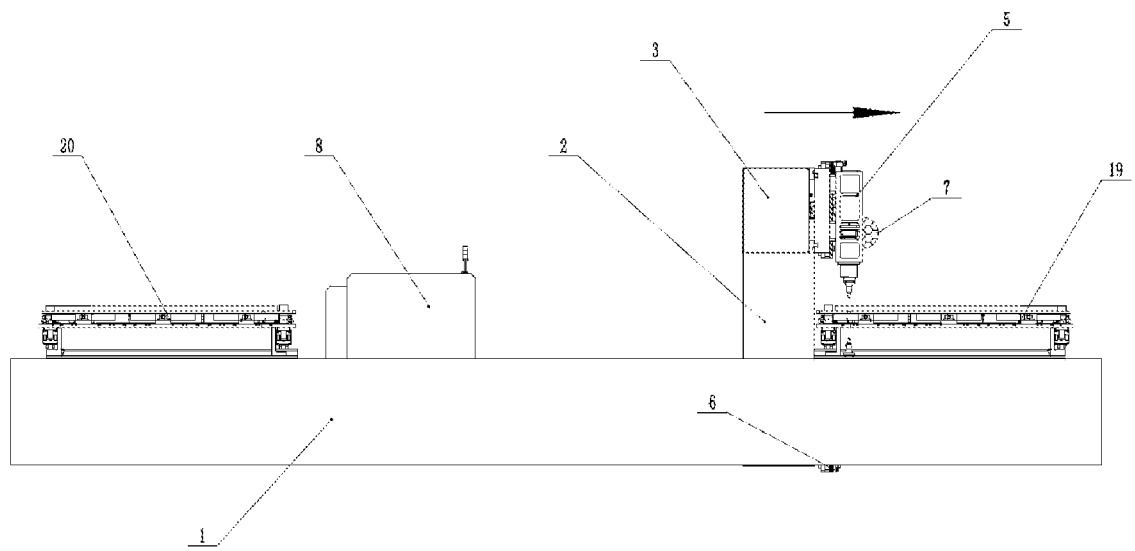
FIG. 5 is a front view of a device in Embodiment 2 of the present disclosure.

Embodiment 2: as shown in FIG. 2, FIG. 3 and FIG. 5, a friction stir welding device of the embodiment comprises: a base 1, a pair of columns 2 arranged on the base 1, an upper beam 3 connected with the top ends of the columns, an upper head 5 arranged on the upper beam 3, a lower beam 4 connected between the lower ends of the columns 2, and a lower head 6 arranged on the lower beam 4 and corresponding to the upper head 5 up and down.

Wherein the columns 2, the upper beam 3 and the lower beam 4 form a gantry having an integrated structure, the upper head 5 and the lower head 6 can move by a drive device and a transmission mechanism along an X-axis, a Y-axis and a Z-axis and rotate along the Z-axis, movement of the upper head 5 and the lower head 6 along the X-axis and the Y-axis is driven by utilizing a linear motor in a screw guide rail or rack-and-pinion guide rail transmission manner, movement of the upper head 5 and the lower head 6 along the Z-axis can utilize a manner of servo electric cylinder transmission, hydraulic transmission, screw transmission, rack-and-pinion transmission and the like, rotation of the upper head 5 and the lower head 6 along the Z-axis can utilize a manner of combining an electric spindle or a mechanical spindle with a motor, and the motor can be a servo motor or an asynchronous motor. Furthermore, the upper head 5 and the lower head 6 have a function of automatically adjusting a technological swing angle, and can adjust a rotation angle.

As shown in FIG. 2, a first worktable 19 and a second worktable 20 connected with a horizontal surface of the base 1 are provided, a rail groove II 10 is formed in the upper surface of the base 1, and the gantry can conduct horizontal reciprocating movement under the drive of the linear motor to form relative movement with the fixed first worktable 19 or the second worktable 20. Furthermore, vision sensors 7 mounted on the upper head 5 and the lower head 6 and used for navigating and identifying welds, and a PCL controller 8 used for controlling operations of the upper head 5, the lower head 6, the first worktable 19/the second worktable 20, and the vision sensors 7 are also provided.

As shown in FIG. 8, the first worktable 19 and the second worktable 20 comprise fixed plates 12 and movable plates 13, which are used for loading 1-3 sets of components to be welded 11 once, and locking mechanisms 14 used for fixing; by a plurality of strip-shaped slots 15 relatively opened in the fixed plate 12 and the movable plate 13, a plurality of welds of the components to be welded 11 are sequentially completed, and meanwhile, a plurality of components are welded in small batch; therefore, multiple clamping and unloading times are reduced, and working efficiency of the device can be greatly improved.

By utilizing the device of the embodiment, a method for welding an aluminium alloy sheet with the thickness of 30 mm comprises the following steps:

S1: loading a component to be welded on the first worktable 19 and the second worktable 20, and driving the first worktable 19 to move towards the gantry under the navigation of the vision sensors 7 while the second worktable 20 is located at an idle station;

S2: adjusting the upper head 5 and the lower head 6 to simultaneously align to and be gradually close to the same welding starting point of a left end weld on the first worktable 19; ensuring that friction stir welding heads 16 of the upper head 5 and the lower head 6 rotate in situ at a speed of 200 r/min to enter the interior of the component to be welded till the tail ends of the upper and lower friction stir welding heads 16 are in contact; then ensuring that the upper head 5 feeds an amount equal to the diameter of one friction stir welding head 16 along the X-axis in order that the upper and lower friction stir welding heads 16 are interleaved mutually; ensuring that the upper head 5 and the lower head 6 to simultaneously feed an amount equal to 10% thickness of the component to be welded along the Z-axis in order that the upper and lower friction stir welding heads 16 are interleaved mutually and their working regions are partially overlapped; then ensuring that the upper and lower friction stir welding heads 16 synchronously move forwards at a rotational speed of 500 r/min and a welding speed of 200 mm/min and sequentially withdraw when reaching a welding tail end so as to complete ending welding of an upper surface and a lower surface of the same weld to be welded;

S3: ensuring the upper head 5 to move along the upper beam 3 in the Y-axis direction and the lower head 6 to move along the lower beam 4 in the Y-axis direction, and repeatedly conducting the step S2 till welding of all welds of the component to be welded on the first worktable 19 is completed; and S4: moving the gantry to a welding region of the second worktable 20 at the idle station, repeatedly conducting the steps S1, S2 and S3, at this time, unloading the welding-completed component with the cooperation of a manipulator, and reloading a component to be welded.

Embodiment 3: the present embodiment and Embodiment 1 are basically the same, and the difference lies in:

(1), in the embodiment, an anti-wear gasket 17 is arranged at the tail end of the friction stir welding head 16, and a manufacturing method of the anti-wear gasket 17 is as follows: mixing 80% tungsten carbide powder, 6% alumina fiber, 7% titanium dioxide powder, 3% vanadium oxide and 4% graphite powder to be smelted to liquid alloy; conducting femtosecond laser disordering irradiation, wherein the repetition frequency of a femtosecond laser is 95 MHz, the frequency of a chopper is adjusted to 4000 Hz, femtosecond pulse number in each chipping cycle is about 18776, and the irradiation time is 6 min; then gradually cooling the liquid alloy to a solid state, re-smelting, repeatedly conducting the above operations for six times, casting and forging forming to obtain an interior-reshaped anti-wear bar; and welding the anti-wear bar and the tail end of the friction stir welding head 16 by utilizing a cold pressure welding technology, cutting the anti-wear bar by a certain thickness to form the anti-wear gasket 17, and grinding and polishing to complete the manufacturing of the anti-wear gasket.

(2), S2 specifically comprises: adjusting the upper head 5 and the lower head 6 to simultaneously align to and be gradually close to the same welding starting point of a left end weld on the first worktable 19; ensuring that friction stir welding heads 16 of the upper head 5 and the lower head 6 rotate in situ at a speed of 800 r/min to enter the interior of the component to be welded till the tail ends of the upper and lower friction stir welding heads 16 reach a depth equal to 40% thickness of the component to be welded 11, wherein the tail ends of the upper and lower friction stir welding heads 16 are not contacted to prevent wear; then ensuring that the upper and lower friction stir welding heads 16 synchronously move forwards at a welding speed of 1500 mm/min and simultaneously withdraw when reaching a welding tail end so as to complete ending welding of an upper surface and a lower surface of the same weld to be welded.

Embodiment 4: the present embodiment and Embodiment 2 are basically the same, and the difference lies in:

(1), in the embodiment, an anti-wear gasket 17 is arranged at the tail end of the friction stir welding head 16, and an external thread 18 is opened in the outer side of the friction stir welding head 16.

(2,) S2 specifically comprises: adjusting the upper head 5 and the lower head 6 to simultaneously align to and be gradually close to the same welding starting point of a left end weld on the first worktable 19; ensuring that friction stir welding heads 16 of the upper head 5 and the lower head 6 rotate in situ at a speed of 15000 r/min to enter the interior of the component to be welded till the tail ends of the upper and lower friction stir welding heads 16 are in contact; then ensuring that the upper head 5 feeds an amount equal to the diameter of one friction stir welding head 16 along the X-axis in order that the upper and lower friction stir welding heads 16 are interleaved mutually; ensuring that the upper head 5 and the lower head 6 to simultaneously feed an amount equal to 10% thickness of the component to be welded along the Z-axis in order that the upper and lower friction stir welding heads 16 are interleaved mutually and their working regions are partially overlapped; then ensuring that the upper and lower friction stir welding heads 16 synchronously move forwards at a rotational speed of 15000 r/min and a welding speed of 7000 mm/min and sequentially withdraw when reaching a welding tail end so as to complete ending welding of an upper surface and a lower surface of the same weld to be welded.

Embodiment 5: the present embodiment and Embodiment 4 are basically the same, and the difference lies in: a wear-resistant coating is sprayed on the external thread 18. A manufacturing method of the wear-resistant coating is: after smelting the above raw material elements and conducting femtosecond laser disordering irradiation, utilizing laser re-smelting and high velocity oxygen fuel methods to crystallize on the external thread 18 to form a coating, wherein the laser re-smelting adopts a fiber laser, its process parameters comprise defocus amount of 3 mm, scanning speed of 3 mm/s, and laser power of 1000 W, and a laser beam is a constant rectangular spot of 1 mm*1 mm. Due to a great particle impact velocity, the sprayed coating and the surface of the friction stir welding head 16 have great bonding strength and are not easy to remove during friction.

Embodiment 6: the present embodiment selects 30 sets of aluminium alloy sheets each with the size of 500 mm*200 mm*8 mm as the experimental material and uses the device of the present disclosure as the experimental object to study working efficiency of devices respectively equipped with different numbers of worktables.

Figure 6:
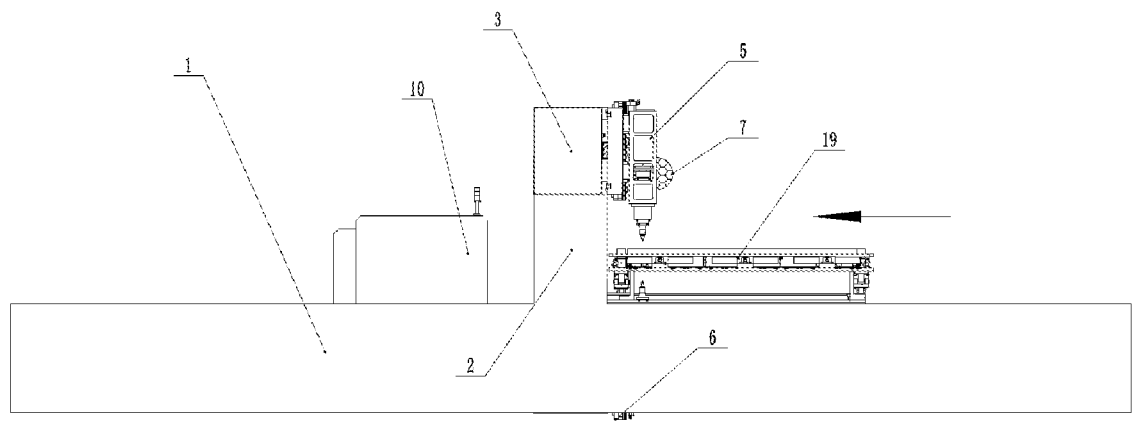
FIG. 6 is a front view of a device equipped with two worktables in Embodiment 6 of the present disclosure, wherein the worktables are movable and a gantry is fixed.
Figure 7:
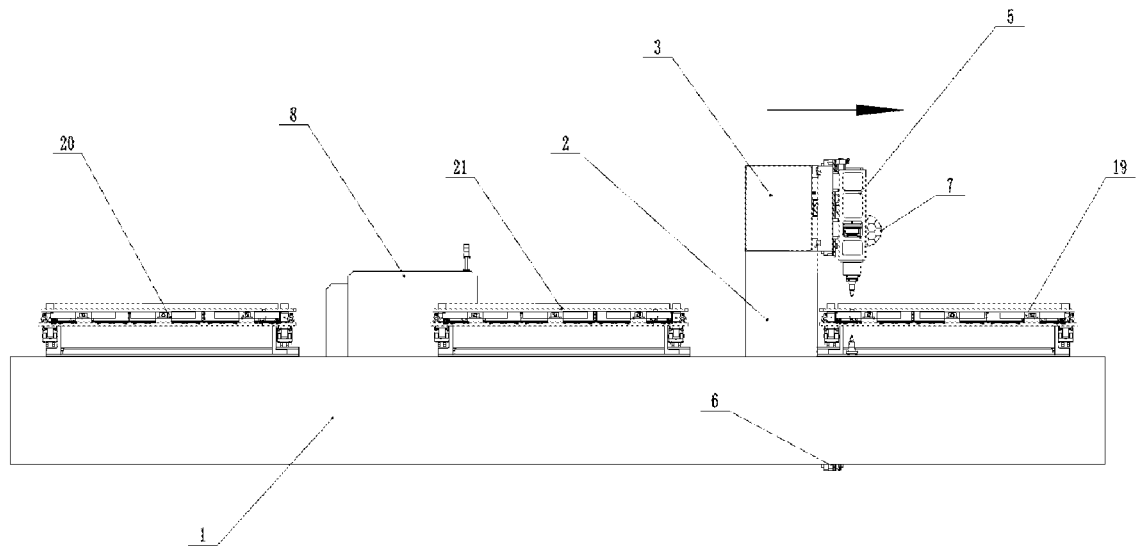
FIG. 7 is a front view of a device equipped with three worktables in Embodiment 7 of the present disclosure, wherein the worktables are fixed and a gantry is movable.

Experiment group 1: as shown in FIG. 6, the device of Embodiment 1 is equipped with a worktable recorded as a first worktable 19;

Experiment group 2: as shown in FIG. 4, the device of Embodiment 2 is equipped with two worktables respectively recorded as a first worktable 19 and a second worktable 20;

Experiment group 3: as shown in FIG. 7, the device of Embodiment 2 is equipped with three worktables respectively recorded as a first worktable 19, a second worktable 20 and a third worktable 21;

Experiment group 4: a device of the Chinese Patent Application No. CN102481659A is used for welding; and Experiment group 5: one-side sequential welding is conducted in a traditional manner.

In Experiment groups 1-5, three sets of components to be welded are simultaneously loaded, the welding speed is 350 mm/min, the other conditions are the same, and results for welding efficiency of four groups are shown in Table 1:

TABLE 1

Comparison of welding efficiency results of 30 aluminum alloy welding components

| | Experiment group 1 | Experiment group 2 | Experiment group 3 | Experiment group 4 | Experiment group 5 |
|---|---|---|---|---|---|
| Total time/min | 52.8 | 51.3 | 51.1 | 75.8 | 108.0 |
| Average time/min | 1.76 | 1.71 | 1.70 | 2.53 | 3.60 |

Conclusion: base on Table 1, the times of welding a single set of components to be welded by utilizing the device of the present disclosure in Experiment groups 1-3 are almost the same, wherein the times of Experiment group 2 and Experiment group 3 are basically the same about 1.7 min, and by considering investment and size of the device, an arrangement of two worktables is the optimal arrangement. The average time of the device in Embodiment group 4 is 2.53 min and is greater than that of the device in Embodiment groups 1-3, and the device does not have a function of simultaneously welding multiple sets of components to be welded so as to relatively waste time in loading and unloading processes. In Experiment group 5, one-side welding is utilized, and overturning and flash polishing consume too much time, so its average time is the greatest and is 3.6 min.

Embodiment 7: the present embodiment selects 30 sets of aluminium alloy sheets each with the size of 500 mm*200 mm*8 mm as the Experimental material to study influence on weldment quality when the device of the present disclosure uses different welding manners to weld components.

Figure 10:
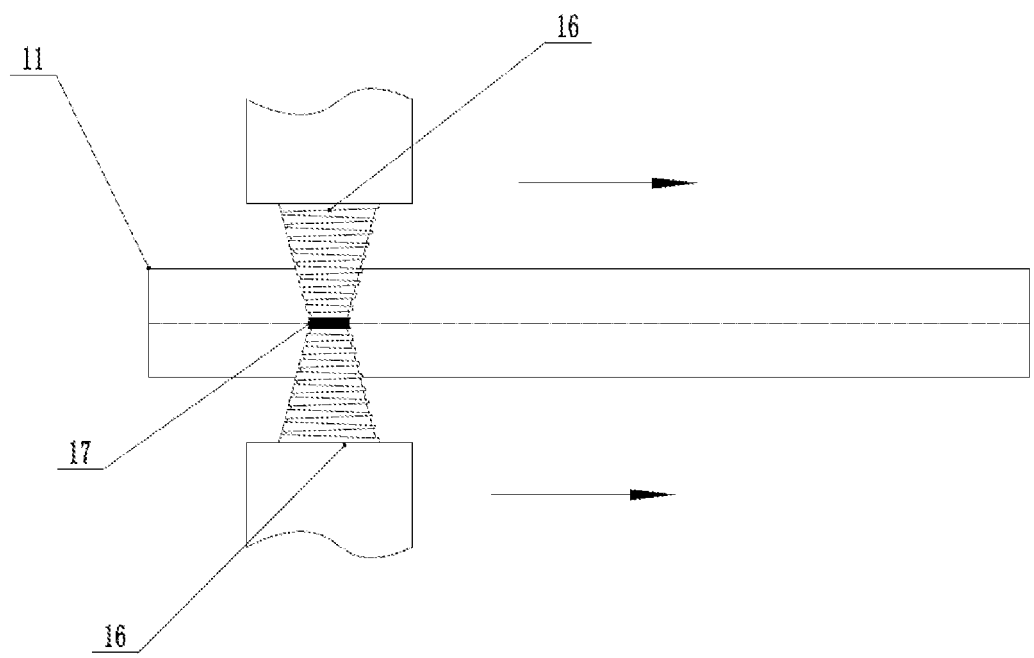
FIG. 10 is a schematic structural diagram showing that two friction stir welding heads of the present disclosure are in relative contact and conduct stir welding.
Figure 11:
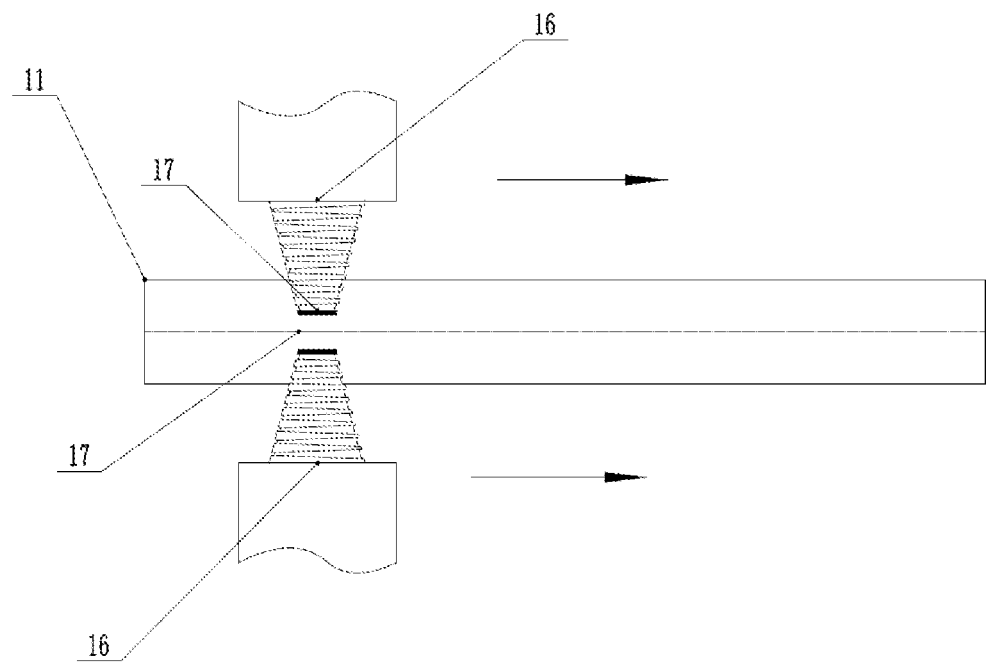
FIG. 11 is a schematic structural diagram showing that two friction stir welding heads of the present disclosure are in relative separation and conduct stir welding.
Figure 12:
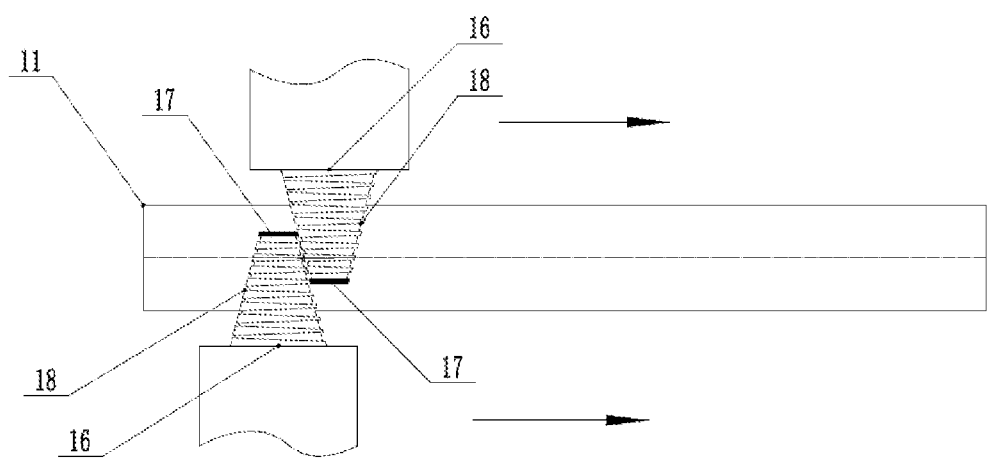
FIG. 12 is a schematic structural diagram showing that two friction stir welding heads of the present disclosure are in relative interleaving contact and conduct stir welding.
Figure 13:
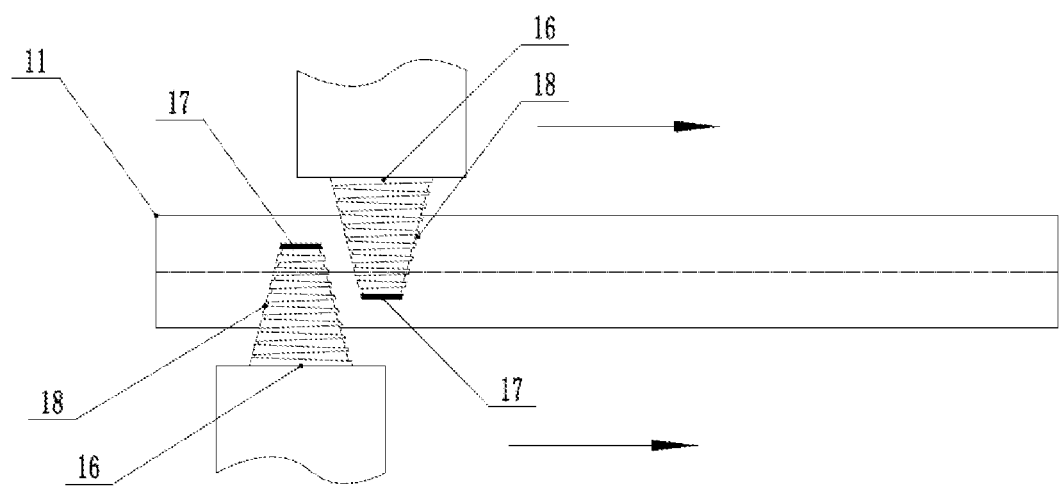
FIG. 13 is a schematic structural diagram showing that two friction stir welding heads of the present disclosure are in relative interleaving separation and conduct stir welding.

Experiment group 1: as shown in FIG. 10, the tail ends of the upper and lower friction stir welding heads 16 are in contact when entering the interior of the component to be welded 11, the anti-wear gasket 17 is arranged at the tail end of the friction stir welding head 16, the stirring speed of the friction stir welding head 16 is 400 r/min, and the welding speed is 250 mm/min;

Experiment group 2: after the tail ends of the upper and lower friction stir welding heads 16 are in contact when entering the interior of the component to be welded 11, the upper head 5 feeds an amount equal to the diameter of one friction stir welding head 16 along the X-axis in order that the upper and lower friction stir welding heads 16 are interleaved mutually and in contact; as shown in FIG. 12, the anti-wear gasket 17 is arranged at the tail end of the friction stir welding head 16, the external thread 18 is opened in the outer side of the friction stir welding head 16, and the wear-resistant coating is sprayed on the external thread 18; and the stirring speed of the friction stir welding head 16 is 400 r/min, and the welding speed is 200 mm/min;

Experiment group 3: the experiment group and Experiment group 1 are basically the same, and the difference lies in: the tail end of the friction stir welding head 16 is not provided with the anti-wear gasket 17;

Experiment group 4: the experiment group and Experiment group 3 are basically the same, and the difference lies in: as shown in FIG. 11, the tail ends of the friction stir welding heads 16 are not in contact;

Experiment group 5: the experiment group and Experiment group 2 are basically the same, and the difference lies in: the two friction stir welding heads 16 are mutually interleaved and are not in contact, as shown in FIG. 13;

Experiment group 6: the experiment group and Experiment group 2 are basically the same, and the difference lies in: the outer side of the friction stir welding head 16 only is provided with the external thread 18 and is not provided with the wear-resistant coating; and Experiment group 7: the experiment group and Experiment group 2 are basically the same, and the difference lies in: the outer side of the friction stir welding head 16 only is provided with the wear-resistant coating and is not provided with the external thread 18.

The 30 sets of aluminium alloy sheets each with the size of 500 mm*200 mm*8 mm are respectively welded by utilizing the welding methods of Embodiment groups 1-7, and in the accumulated time of 100 h, performance detection is conducted on finished products which complete the welding, and the results are shown in Table 2.

TABLE 2

Performance detection results of welding finished-products and friction stirring welding heads by different welding methods

| Group | Tensile strength/ MPa | Cross section roughness/ micron | Elongation (%) | Joint strength coefficient (%) | Friction stir welding head wear rate (%) |
|---|---|---|---|---|---|
| Experiment 1 | 269 | 10.6 | 26.9 | 96.1 | 1.1 |
| Experiment group 2 | 298 | 5.5 | 29.5 | 98.6 | 0.7 |
| Experiment 3 | 280 | 12.5 | 24.0 | 93.6 | 6.7 |
| Experiment 4 | 281 | 12.3 | 23.8 | 93.8 | 0.5 |
| Experiment 5 | 276 | 6.5 | 26.4 | 96.8 | 0.6 |
| Experiment 6 | 284 | 6.8 | 27.3 | 97.3 | 5.2 |
| Experiment group 7 | 270 | 8.5 | 25.8 | 95.0 | 1.2 |

Conclusion: based on Table 2, all items of finished product performance detection in Experiment group 2 are optimal, and interleaving and overlapping stirring helps the stirring to be more fully so that the cross section roughness is smaller. In Experiment group 4, under the protection of the anti-wear gasket and the wear-resistant coating, the upper and lower friction stir welding heads are not in contact, so the wear rate is the lowest and only is 0.5%; a second wear rate is 0.6% in Experiment group 5, wherein the two friction stir welding heads are interleaved, and their extension length in the component to be welded is greater than that in Experiment group 4, so the wear is slightly serious; and in Experiment group 2, the external threads of the two friction stir welding heads 16 need to be rubbed, so the wear rate is higher and is 0.7%.

Embodiment 8: the anti-wear gaskets manufactured by utilizing different materials and manufacturing methods are relatively propped, and the wear resistance of the anti-wear gaskets manufactured by utilizing different materials is tested by utilizing a rotational speed of 400 r/min within an accumulated time of 100 h, as shown in Table 3:

TABLE 3

Test on wear resistance of anti-wear gaskets manufactured by different materials

| Group | Material | Whether to utilize femtosecond laser irradiation | Wear rate (%) |
|---|---|---|---|
| First group | The present invention | Yes | 1.1% |
| Second group | The present invention | No | 1.3% |
| Third group | Copper-tungsten alloy | Yes | 1.6% |
| Fourth group | Copper-tungsten alloy | No | 1.7% |
| Fifth group | High manganese steel | Yes | 2.5% |
| Sixth group | High manganese steel | No | 2.7% |

Conclusion: based on the embodiment, the lowest wear rate of the manufactured anti-wear gasket is 1.1%, and furthermore, on the premise of utilizing the same material, the wear rate of the anti-wear gasket utilizing the femtosecond laser irradiation is lower than that of the anti-wear gasket not utilizing the femtosecond laser irradiation.

What is claimed is:

1. A double-head double-sided friction stir welding device, comprising:
    a base;
    a pair of columns arranged on the base;
    an upper beam connected with the top ends of the columns, wherein an upper head is arranged on the upper beam; a lower beam connected between the lower ends of the columns, wherein a lower head is arranged on the lower beam and corresponds to the upper head up and down, the columns, the upper beam and the lower beam form a gantry having an integrated structure, the upper head and the lower head can move by a drive device and a transmission mechanism along an X-axis, a Y-axis and a Z-axis and rotate along the Z-axis, each pair of the upper head and the upper beam and the lower head and the lower beam is connected through a rotary shaft, and welding angle adjustment can be conducted on the upper head and the lower head through the rotary shafts;
    at least one worktable connected with a horizontal surface of the base, wherein the worktable is located between the upper head and the lower head, and the worktable and the gantry can relatively move to achieve welding;
    vision sensors mounted on the upper head and the lower head and used for identifying the weld; and
    a CNC controller used for controlling operations of the gantry, the upper head, the lower head, the worktable and the vision sensors, wherein a rail groove is formed in the upper surface of the base, and the gantry can conduct horizontal reciprocating movement along the rail groove under the drive of the linear motor or the motor-driven rack-and-pinion mechanism to form relative movement with the fixed worktable.

2. The double-head double-sided friction stir welding device according to claim 1, characterized in that the worktable comprises a fixed plate and a movable plate, which are used for loading multiple sets of components to be welded once, and locking mechanisms used for fixing; and by a plurality of strip-shaped slots relatively opened in the fixed plate and the movable plate, a plurality of welds of the components to be welded are sequentially completed.

3. A double-head double-sided friction stir welding device, comprising:
    a base;
    a pair of columns arranged on the base;
    an upper beam connected with the top ends of the columns, wherein an upper head is arranged on the upper beam; a lower beam connected between the lower ends of the columns, wherein a lower head is arranged on the lower beam and corresponds to the upper head up and down, the columns, the upper beam and the lower beam form a gantry having an integrated structure, the upper head and the lower head can move by a drive device and a transmission mechanism along an X-axis, a Y-axis and a Z-axis and rotate along the Z-axis, each pair of the upper head and the upper beam and the lower head and the lower beam is connected through a rotary shaft, and welding angle adjustment can be conducted on the upper head and the lower head through the rotary shafts;
    at least one worktable connected with a horizontal surface of the base, wherein the worktable is located between the upper head and the lower head, and the worktable and the gantry can relatively move to achieve welding;

vision sensors mounted on the upper head and the lower head and used for identifying the weld; and a CNC controller used for controlling operations of the gantry, the upper head, the lower head, the worktable and the vision sensors, wherein anti-wear gaskets are arranged at the tail ends of friction stir welding heads of the upper head and the lower head, an external thread is also opened in the friction stir welding head, and a wear-resistant coating is sprayed on the external thread.

4. A double-head double-sided friction stir welding device, comprising:

a base;

a pair of columns arranged on the base;

an upper beam connected with the top ends of the columns, wherein an upper head is arranged on the upper beam; a lower beam connected between the lower ends of the columns, wherein a lower head is arranged on the lower beam and corresponds to the upper head up and down, the columns, the upper beam and the lower beam form a gantry having an integrated structure, the upper head and the lower head can move by a drive device and a transmission mechanism along an X-axis, a Y-axis and a Z-axis and rotate along the Z-axis, each pair of the upper head and the upper beam and the lower head and the lower beam is connected through a rotary shaft, and welding angle adjustment can be conducted on the upper head and the lower head through the rotary shafts;

at least one worktable connected with a horizontal surface of the base, wherein the worktable is located between the upper head and the lower head, and the worktable and the gantry can relatively move to achieve welding;

vision sensors mounted on the upper head and the lower head and used for identifying the weld; and a CNC controller used for controlling operations of the gantry, the upper head, the lower head, the worktable and the vision sensors, wherein the worktable comprises a fixed plate and a movable plate, which are used for loading multiple sets of components to be welded once, and locking mechanisms used for fixing; and by a plurality of strip-shaped slots relatively opened in the fixed plate and the movable plate, a plurality of welds of the components to be welded are sequentially completed.

5. The double-head double-sided friction stir welding device according to claim 3, characterized in that a rail groove is formed in the inner side of the base, and the worktable can conduct horizontal reciprocating movement along the rail groove under the drive of a linear motor or a motor-driven rack-and-pinion mechanism to form relative movement with the fixed gantry, wherein the worktable comprises a fixed plate and a movable plate, which are used for loading multiple sets of components to be welded once, and locking mechanisms used for fixing; and by a plurality of strip-shaped slots relatively opened in the fixed plate and the movable plate, a plurality of welds of the components to be welded are sequentially completed.

6. The double-head double-sided friction stir welding device according to claim 3, characterized in that raw materials of the anti-wear gasket and the wear-resistant coating comprise: 70-80 percent by weight of tungsten carbide powder, 4-6 percent by weight of alumina fiber, 5-7 percent by weight of titanium dioxide powder, 1-3 percent by weight of vanadium oxide and the balance of graphite powder;

a manufacturing method of the anti-wear gasket comprises: smelting the above raw materials; conducting femtosecond laser disordering irradiation; cooling, re-smelting and then repeatedly conducting the above operations for 5-8 times; casting, and forging forming to obtain an interior-reshaped anti-wear bar; and welding the anti-wear bar and the tail end of the friction stir welding head by utilizing a cold pressure welding technology, cutting the anti-wear bar by a certain thickness to form the anti-wear gasket, and grinding and polishing to complete the manufacturing of the anti-wear gasket; and a manufacturing method of the wear-resistant coating comprises: after smelting the above raw materials and conducting the femtosecond laser disordering irradiation, utilizing laser re-smelting and high velocity oxygen fuel methods to crystallize on the external thread to form a coating.

* * * * *